United States Patent
Young et al.

(10) Patent No.: US 9,502,715 B2
(45) Date of Patent: Nov. 22, 2016

(54) DISORDERED ANODES FOR NI-METAL RECHARGEABLE BATTERY

(71) Applicant: Ovonic Battery Company, Inc., Rochester Hills, MI (US)

(72) Inventors: Kwo-hsiung Young, Troy, MI (US); Lixin Wang, Ypsilanti, MI (US); William C. Mays, Commerce, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 119 days.

(21) Appl. No.: 14/603,904

(22) Filed: Jan. 23, 2015

(65) Prior Publication Data

US 2016/0218366 A1   Jul. 28, 2016

(51) Int. Cl.
| | |
|---|---|
| *H01M 4/52* | (2010.01) |
| *H01M 4/50* | (2010.01) |
| *H01M 10/30* | (2006.01) |
| *H01M 4/02* | (2006.01) |
| *H01M 4/525* | (2010.01) |
| *H01M 4/32* | (2006.01) |

(52) U.S. Cl.
CPC ............. *H01M 4/523* (2013.01); *H01M 4/502* (2013.01); *H01M 10/30* (2013.01); *H01M 4/32* (2013.01); *H01M 4/52* (2013.01); *H01M 4/525* (2013.01); *H01M 2004/027* (2013.01); *H01M 2004/028* (2013.01)

(58) Field of Classification Search
CPC ...... H01M 4/52; H01M 4/523; H01M 4/525; H01M 10/30; H01M 4/32
See application file for complete search history.

(56) References Cited

U.S. PATENT DOCUMENTS

| | | |
|---|---|---|
| 5,344,728 A | 9/1994 | Ovshinsky et al. |
| 5,348,822 A | 9/1994 | Ovshinsky et al. |
| 5,567,549 A | 10/1996 | Ovshinsky et al. |
| 5,569,563 A | 10/1996 | Ovshinsky et al. |
| 8,486,563 B2 | 7/2013 | Chou et al. |
| 2011/0229755 A1* | 9/2011 | Sugii ..................... H01M 4/383 429/163 |

OTHER PUBLICATIONS

Gao, X. et al., "Alkaline rechargeable Ni/Co batteries: Cobalt hydroxides as negative electrode materials," *Energy Environ. Sci.*, 2009, 2, 502-505.

* cited by examiner

*Primary Examiner* — Stewart Fraser
(74) *Attorney, Agent, or Firm* — Dinsmore & Shohl LLP; Weston R. Gould

(57) ABSTRACT

An electrochemical cell is provided that includes a structurally and compositionally disordered electrochemically active alloy material as an anode active material with unexpected capacity against a nickel hydroxide based cathode active material. The disordered metal hydroxide alloy includes three or more transition metal elements and is formed in such a way so as to produce the necessary disorder in the overall system. When an anode active material includes nickel as a predominant, the resulting cells represent the first demonstration of a functional Ni/Ni cell.

10 Claims, 4 Drawing Sheets

DISORDERED ANODES FOR NI-METAL RECHARGEABLE BATTERY

STATEMENT OF GOVERNMENT SPONSORSHIP

This invention was made with government support under contract no. DE-AR00003886, awarded by Advanced Research Projects Agency—Energy—U.S. Department of Energy. The government has certain rights in the invention.

FIELD OF THE INVENTION

This invention relates to secondary electrochemical cells. In particular, provided are Ni/Ni based secondary batteries that employ a disordered nickel hydroxide based anode that provides unexpectedly functional capabilities.

BACKGROUND OF THE INVENTION

The increasing use of electronic devices and electric vehicles continues to drive up the demand for ever improved power sources. Among the rechargeable power sources, alkaline rechargeable batteries are considered a family of the most promising for their desirable energy density and power. Several alkaline electrode systems have been developed for use in alkaline secondary batteries including nickel/cadmium (Ni/Cd), nickel/iron (Ni/Fe), nickel/hydrogen (Ni/$H_2$), nickel/zinc (Ni/Zn), and nickel metal hydride (Ni/MH). Among these systems, Ni/MH batteries showed the greatest application due to their relative environmental safety and high energy density.

When an electrical potential is applied between the cathode and a suitable anode in a metal hydride alkaline cell, the negative electrode material is charged by the electrochemical absorption of a single hydrogen to form a metal hydride (MH) and the electrochemical evolution of a hydroxyl ion. For a $Cd(OH)_2$ based anode material, as another example, two electron reactions are possible whereby the material reacts with two electrons forming metallic Cd and two hydroxyl ions. These reactions are reversed during discharge.

The reactions that take place at the positive electrode of a nickel cell are also reversible. The following charge and discharge reactions take place at a nickel hydroxide positive electrode.

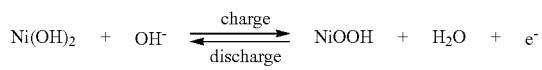

Thus, an alkaline cell employing an anode material capable of multi-electron transfer should provide superior energy density.

Despite expected increases in energy density, prior cells employing anode materials capable of multi electron reactions each suffer significant drawbacks. Some of the earliest successful batteries of this type, Ni/Cd, provided insufficient energy density and suffer the drawback of severe environmental unfriendliness. Cd is a toxic heavy metal requiring specialized care during disposal. Ni/Fe batteries have been available for over 100 years and do not suffer the issues of environmental toxicity and are extremely tolerant of abuse. Ni/Fe batteries also have the advantage of being based on abundant material sources. However, Ni/Fe batteries suffer from relatively low energy density and low rate. Ni/Zn secondary batteries have been explored and used for over a century. These battery systems suffer from zinc hydroxide tending to dissolve into solution resulting in the formation of dendrites that reduce charging performance producing low cycle life.

As will be explained hereinbelow, the present invention is directed to compositionally and structurally disordered nickel based alloy materials used as an anode in a Ni/Ni cell that for the first time demonstrates the ability of $Ni(OH)_2$ to be useful as a negative electrode material in an alkaline rechargeable cell. For a $Ni(OH)_2$ material as provided herein used in as a negative electrode material, the half-cell reaction during charge is:

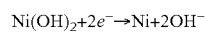

illustrating the multi electron transfer potential of this material.

These and other advantages of the invention will be apparent from the drawings, discussion, and description which follow.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Provided are alkaline rechargeable cells that include a nickel hydroxide based material as a positive electrode material and a compositionally and structurally disordered metal hydride material as a negative electrode material. It was unexpectedly found that introducing and or maintaining a disordered structure to the anode material either creates or improves discharge capacity allowing additional materials to be used as a negative electrode material in an alkaline secondary cell. Such a disordered system also, for the first, time provides functionality to a Ni/Ni alkaline secondary cell.

As such, an alkaline rechargeable cell is provided that includes: a cathode including as a cathode active material a nickel hydroxide based material; an anode that includes an anode active material formed in part or in whole of a compositionally and structurally disordered metal hydroxide alloy material comprising three or more transition metals; and an electrolyte in chemical contact with the cathode active material and the anode active material. The metal hydroxide alloy material of the anode active material optionally includes a material capable of multi-electron transfer when based against the cathode active material, optionally two electron transfer. In some aspects, the metal hydroxide alloy comprises nickel as a predominant transition metal. Optionally, a metal hydroxide alloy includes a transition metal selected from the group consisting of Ti, V, Cr, Mn, Fe, Co, Ni, Cu, Zn, Ag, Au, Cd, or combinations thereof. Optionally, the metal hydroxide alloy comprises three transition metals, optionally consisting of Ni, Co, and Mn. In some aspects, the metal hydroxide alloy includes a material of the formula $Ni_xCo_yMn_z(OH)_2$ where $0.3 \leq x \leq 0.5$, $0.2 \leq y \leq 0.4$, $0.3 \leq z \leq 0.4$, or combinations thereof, where x, y, and z are relative atomic amounts of Ni, Co and Mn respectively, and where $x+y+z=1$. As illustrative examples of a metal hydroxide alloy used as an anode active material, the anode may include $Ni_{0.33}Co_{0.33}Mn_{0.33}(OH)_2$, $Ni_{0.4}Co_{0.2}Mn_{0.4}(OH)_2$, or $Ni_{0.5}Co_{0.2}Mn_{0.3}(OH)_2$.

In any aspect or combination of the foregoing aspects, the metal hydroxide alloy is optionally absent a (100) peak by XRD analysis.

In any aspect of combination of the foregoing aspects, the metal hydroxide alloy optionally comprises a capacity of 15 mAh/g or greater against the cathode active material.

Overall, compositionally and structurally disordered metal hydroxide alloy materials are provided that may be used as an anode active material in an alkaline rechargeable cell against a cathode that includes a nickel hydroxide. Such a disordered system for the first time establishes functionality of a Ni/Ni cell when such aspects are constructed.

BRIEF DESCRIPTION OF EMBODIMENTS OF THE INVENTION

Figure 1:
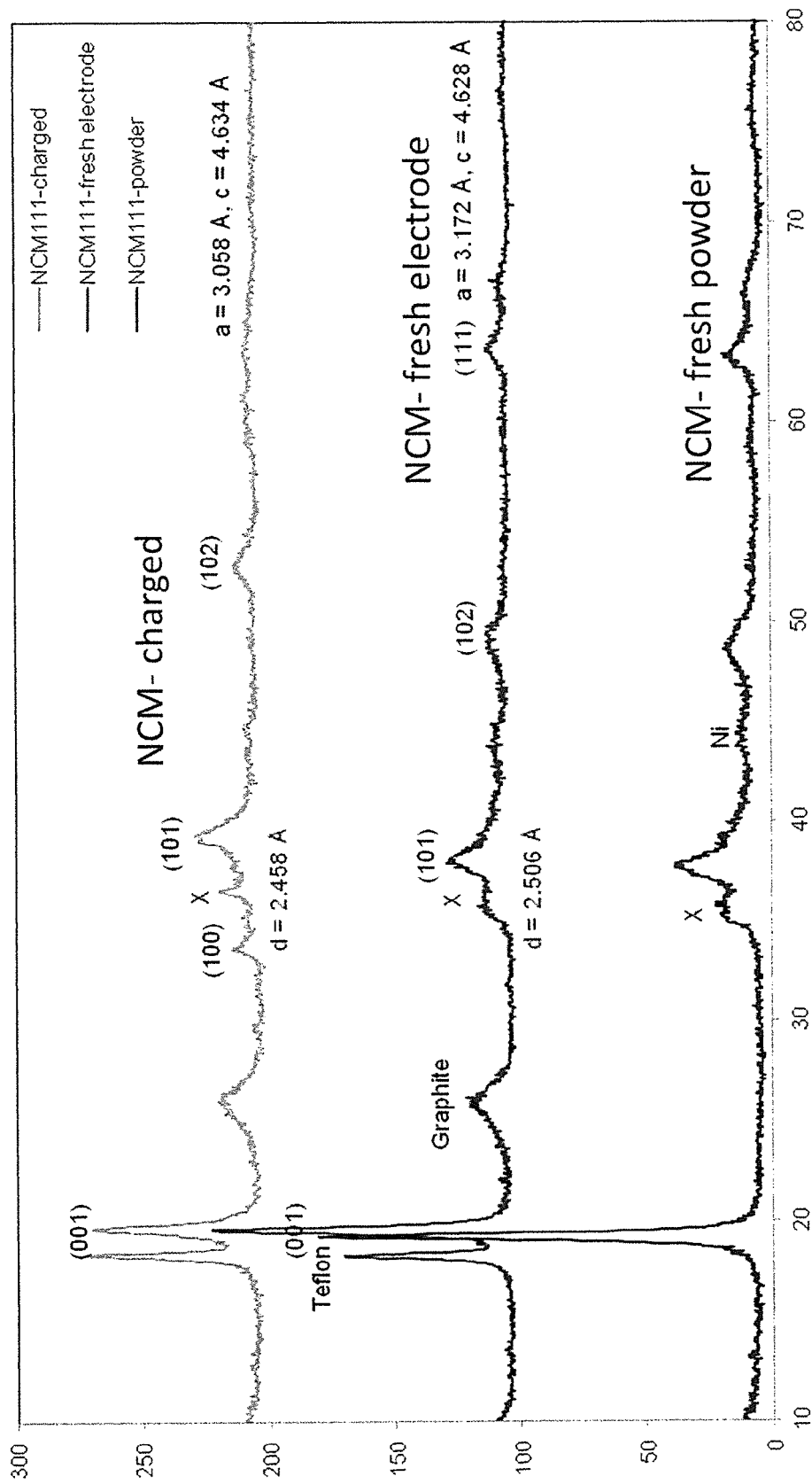
FIG. 1 illustrates the results of XRD analyses of an NCM 111 material used as an anode active material in an electrochemical cell illustrating the absence of a (100) peak illustrating disordered structure in plane.

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

Scientific and technical terms used herein are intended to have the meanings commonly understood by those of ordinary skill in the art unless otherwise defined herein.

For purposes of this disclosure the terms "batteries" and "cells" will be used interchangeably when referring to one electrochemical cell, although the term "battery" can also be used to refer to a plurality of electrically interconnected cells.

As defined herein, an "anode" includes a material that acts as an electron acceptor during charge.

As defined herein, a "cathode" includes a material that acts as an electron donor during charge.

As defined herein, the term "disordered" means of predominantly non-uniform composition or structure. Disorder can refer to random or non-random and non-uniform composition or structure. The term "compositionally disordered" is understood as a random or non-random, and non-uniform arrangement of elements in the overall composition. The term "structurally disordered" is understood as a random or non-random, and non-uniform arrangement of crystal or other macrostructure in the overall composition.

The term "predominant" is defined as the greatest amount relative to other comparative elements or materials.

As defined herein, the term "chemical contact" means that the electrolyte is in sufficient physical contact with the cathode and the anode that ions may be transferred from the electrolyte to the cathode, the anode, or both either directly or through a separator or other divider.

A secondary electrochemical cell is provided that includes a cathode including a nickel hydroxide based material, an anode including a compositionally and structurally disordered metal hydroxide alloy material including three or more transition metals, and an electrolyte in chemical contact with the cathode and the anode. The capacity of anodes used in typical nickel metal hydride cells is limited by the poor electronic and proton conductivity in the metal hydroxide—an issue that was expected to be especially true in the case of Ni/Ni battery. It was unexpectedly discovered, however, that disordered structure or composition of a nickel based anode material allows such a material to be used in a Ni/Ni cell.

A material with a higher degree of disorder may, in some aspects, be observed using XRD by the absence of a (100) peak thereby indicating high disorder in ab-plane. A disordered alloy may be substantially uniformly disordered in distribution of elements. An example of an alloy material having disorder upon formation is a NCM (111) alloy formed as per a co-precipitation method formed substantially as described in U.S. Patent Application Publication No: 2012/0009476.

It is to be understood that within the context of this description, the metal hydroxide alloy material used as an anode active material in an electrochemical cell of the present invention may be of a single chemical composition which is present in one or more phases, or the alloy material may be a composite of two or more differing chemical compositions.

In some aspects, a metal hydroxide alloy used in an anode active material includes three or more transition metals that are disordered within the structure of the alloy material. Illustrative examples of a transition metal that may be included in an anode active material are Ti, V, Cr, Mn, Fe, Co, Ni, Cu, Zn, Ag, Au, Cd, or combinations thereof. In some aspects, a transition metal includes Cd, Ni, Co, Fe, Zn, Mn, or combinations thereof. In some aspects, a transition metal includes Ni, Co, Mn, or combinations thereof. Optionally, a single transition metal is present as a predominant.

A metal hydroxide alloy used as an anode active material optionally includes nickel as an exemplary transition metal. In some aspects, a metal hydroxide alloy includes nickel as the predominant transition metal being present at a concentration higher than other transition metals. Optionally, nickel is present at an atomic percentage of at or greater than 2%, 3%, 4%, 5%, 6%, 7%, 8%, 9%, 10%, 11%, 12%, 13%, 14%, 15%, or greater. In some aspects, nickel is present at or between an atomic percentage of 2% and 60%, optionally 10% and 50%, optionally 30% and 40%.

Optionally, a metal hydroxide alloy used as an anode active material optionally includes a first transition metal as a predominant and a second transition metal at an atomic percentage of 5% or greater. A second transition metal is optionally present at an atomic percentage of at or greater than 5%, 6%, 7%, 8%, 9%, 10%, 11%, 12%, 13%, 14%, 15%, or greater.

In some aspects, an alloy includes a primary phase and one or more secondary phases. Optionally, the number of secondary phases is 1, 2, 3, 4, 5, 6, 7, or more. By contributing to the electrochemical performance of an alloy, a secondary phase is electrochemically active and functions synergistically with a primary phase to improve one or more measures of electrochemical performance relative to a system that is absent the secondary phase at the active level. It was unexpectedly discovered that in a disordered alloy system, the presence of an electrochemically active secondary phase at a particular level synergistically functions with a primary phase to improve one or more measures of electrochemical performance.

An electrochemically active secondary phase is optionally present at a phase abundance of 2% to 8% in the material, or any value or range therebetween. Optionally, a secondary phase is present at a level of 2% to 6%. Optionally, a secondary phase is present at a phase abundance percent level of 2, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.

An anode includes a metal hydroxide alloy that in some aspects is absent a (100) peak by XRD analysis. The absence of such a (100) peak is indicative of the absence of in-plane periodicity and is a mark of structural disorder in the material in some aspects. It was found that in the presence of such structural disorder a nickel based metal hydroxide alloy used as an anode active material against a nickel hydroxide cathode active material possessed unexpected capacity that is lost upon the formation of order in the anode active material. Thus, the presence of the disordered structure in the anode active material is a mark of an electrochemically active material in the inventive secondary cell.

A disordered metal hydroxide alloy used in an anode active material optionally has a capacity of 5 mAh/g or greater against a nickel hydroxide based material, optionally $Ni(OH)_2$. In some aspects, the capacity of the metal hydroxide alloy used in an anode active material is 6 mAh/g, 7 mAh/g, 8 mAh/g, 9 mAh/g, 10 mAh/g, 11 mAh/g, 12 mAh/g, 13 mAh/g, 14 mAh/g, 15 mAh/g, 16 mAh/g, 17 mAh/g, 18 mAh/g, 19 mAh/g, 20 mAh/g, 21 mAh/g, 22 mAh/g, 23 mAh/g, 24 mAh/g, 25 mAh/g, or greater.

In some aspects, an anode active material includes a metal hydroxide of the formula $Ni_xCo_yMn_z(OH)_2$ where $0.3 \le x \le 0.5$, $0.2 \le y \le 0.4$, $0.3 \le z \le 0.4$, or combinations thereof, where x, y, and z are relative atomic amounts of Ni, Co and Mn respectively, and where $x+y+z=1$. Such a composition may be formed into a structurally disordered material suitable for use in an alkaline rechargeable cell against a cathode that is based on a nickel hydroxide as a predominant. In some aspects, the anode active material includes a metal hydroxide of the formula $Ni_xCo_yMn_z(OH)_2$ where x is optionally from 0.3 to 0.5, or any value or range therebetween. Optionally, x is from 0.3 to 0.5. Optionally, x is 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, or 0.50. In the metal hydroxide y is optionally from 0 to 0.4, or any value or range therebetween. Optionally, y is from 0.2 to 0.4. Optionally, y is 0.20, 0.21, 0.22, 3.23, 0.24, 0.25, 0.26, 0.27, 0.28, 0.29, 0.30, 0.31, 0.32, 0.33, 0.34, 0.35, 0.36, 0.37, 0.38, 0.39, or 0.40. In the metal hydroxide, z is optionally from 0.3 to 0.4, or any value or range therebetween. Optionally, z is from 0.3 to 0.4. Optionally, z is 0.30, 0.31, 0.32, 0.33, 0.34, 0.35, 0.36, 0.37, 0.38, 0.39, or 0.40. Some aspects include Ni, Co, and Mn at any value or range listed above.

In some aspects, that metal hydroxide alloy is or includes $Ni_{0.33}Co_{0.33}Mn_{0.33}(OH)_2$. In some aspects, that metal hydroxide alloy is or includes $Ni_{0.4}Co_{0.2}Mn_{0.4}(OH)_2$. In some aspects, that metal hydroxide alloy is or includes $Ni_{0.5}Co_{0.2}Mn_{0.3}(OH)_2$.

An alkaline secondary cell includes a cathode including a cathode active material that is nickel hydroxide based. The term "nickel hydroxide based" is defined herein as including a nickel hydroxide as the predominant cathode electrochemically active material. In some aspects, a nickel hydroxide based material used in a cathode is solely $Ni(OH)_2$ as the active material. Such cathode active materials are commercially available as recognized in the art. Illustrative examples of cathode active materials can be found in U.S. Pat. Nos. 5,344,728 and 5,348,822 (which describe stabilized disordered positive electrode materials) and U.S. Pat. No. 5,569,563 and U.S. Pat. No. 5,567,549.

An anode active material or a cathode active material may be formed by a mechanical alloying processes such as ball milling, impact milling, attritor milling, and the like, which may be utilized to at least partially alloy the particles mechanically. In some aspects, an active material is formed into an ingot by induction melting and subjecting the ingot to annealing in an inert gas such as argon. An anode active material is optionally formed by a co-precipitation process such as that described in U.S. Patent Application Publication No: 2012/0009476.

An anode or a cathode may be formed by intermixing a major amount of an active powder material and a minor amount of a binder material such as a synthetic resin powder or the like (optionally at 1-10% by weight of solvent) in a solvent to prepare a slurry and applying the resulting slurry to a substrate followed by drying and optionally pressing. Exemplary binders include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, and a polymer having ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon. Examples of solvent include carbonate-based, ester-based, ether-based, ketone-based, alcohol-based, or aprotic solvents. Illustrative solvents include SMEO, N-methylpyrrolidone (NMP), ethylene glycol and water.

The mixture can also include a thickener, such as an aqueous solution of carboxymethylcellulose (CMC) or the like, to form a paste. In some aspects, a conduction promoter is included in an electrode active material, optionally copper.

A paste of active material may be layered or pressed upon an electrochemically conductive substrate optionally in the form of a plate or sheet, optionally porous, and optionally made of nickel or nickel-plated steel, copper, aluminum, or combinations thereof. The substrate can be a punched or perforated sheet, an expanded plate, or the like. After the active material is contacted to the substrate, the resulting anode or cathode may be sintered. The form of a porous metal substrate optionally includes, but is not limited to, mesh, grid, matte, foil, foam, plate, and expanded metal. Optionally, the porous metal substrate is foam. In some aspects, a porous metal substrate is formed from copper, copper-plated nickel, or a copper-nickel alloy. To protect the porous metal substrate of the from the harsh battery environment, the porous metal substrate may be plated with a material which is electrically conductive yet resistant to corrosion in the battery environment. In some aspects, the porous metal substrate may be plated with nickel.

The conductivity of the electrode can also be increased by copper plating after the active material has been compressed (and possibly sintered) onto the substrate. The copper plating may be patterned or unpatterned. As well as increasing electrode conductivity, the copper plating provides an additional means of ensuring that the active material remains adhered to the substrate.

An electrode tab may be attached to each of the negative and positive electrodes in order to electrically connect each of the electrodes to the appropriate terminal of the battery (i.e., negative electrode to negative terminal and positive electrode to positive terminal). The electrode tab may be welded by a method of welding that includes, but is not limited to, resistance welding, laser welding, electron beam welding, or ultrasonic welding.

An electrochemical cell includes an alkaline electrolyte. Illustrative examples of alkaline electrolytes include liquid and solid electrolytes. An electrolyte optionally is or includes 20 to 45 weight percent KOH or NaOH in water.

An electrochemical cell typically includes a separator positioned between the electrodes. A separator is optionally a non-woven, felted, nylon, or polypropylene material that is permeable to hydroxide ions and may be suitably saturated with electrolyte.

An anode, cathode, electrolyte, and separator may be housed in a casing as is typically known in the art to form an enclosed or substantially enclosed electrochemical cell.

The resulting alkaline rechargeable cell for the first time establishes the functionality of a Ni/Ni secondary cell. The presence of disorder in the anode active material provides functionality that is otherwise not observed. Additional studies will establish improved electrochemical properties of the anode active material and provide improved functionality is systems where alkaline secondary cells may be employed.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXPERIMENTAL

A series of metal hydroxide alloys were prepared by various co-precipitation reactions. Briefly, a nickel cobalt manganese (NCM) precursor is prepared by combining a nickel salt, a cobalt salt, and a manganese salt in the form of a sulfate, a nitrate, an acetate, a halide, a hydroxide, or an oxyhydroxide. The lithium nickel cobalt manganese precursor may be prepared by mixing the nickel salt, the cobalt salt, and the manganese salt in a desired mole ratio in an aqueous solution and then adding sodium hydroxide to the aqueous solution to maintain a basic pH. During the coprecipitation process, a temperature, pH, reaction time, concentration of slurry, stirring speed, or ion concentration may be suitably controlled to adjust a ratio of components or amounts of salt ions, and moreover, to adjust an average particle diameter, particle diameter distribution, and particle density. A reaction time may be short so that the core portion of the nickel complex oxide precursor is porous with low density, and may be from about 30 minutes to about 2 hours, for example, from about 1 hour to about 2 hours.

Specifically, nickel, cobalt and manganese are combined in water a mole ratio of nickel nitrate, manganese nitrate, and cobalt nitrate of 0.4:0.2:0.4 or 0.33:0.33:0.33. A 10 to 15 M ammonia solution is added to the mixed solution for 5 to 10 hours, and a 12 M sodium hydroxide aqueous solution is subsequently added thereto, to achieve a pH of the resultant solution of 11.5.

The resulting materials are subjected to physical and chemical analyses.

XRD Analyses

Microstructure of the alloys was studied utilizing a Philips X'Pert Pro X-ray diffractometer. The XRD patterns of the samples (as-formed, as prepared in an electrode, and following a charge-discharge cycle) are shown in FIG. 1. In the as formed NCM 111 powder, the (100) peak corresponding to in-plane periodicity is missing, indicating high disorder in the arrangement of Ni, Co, and Mn on the plane. This disorder is maintained upon formation of an anode using the active material.

After cycling, the lattice constant a reduced and c increased. Also, a (100) peak appeared and d-spacing of phase X reduced. Considering the atomic size is in the order of Mn>Co>Ni in the anode active material, the reduction in the in-plane lattice constant a may imply segregation of $Ni(OH)_2$ phase, which is believed will cause a degradation in capacity.

Phase Distribution and Composition

Figure 2A:
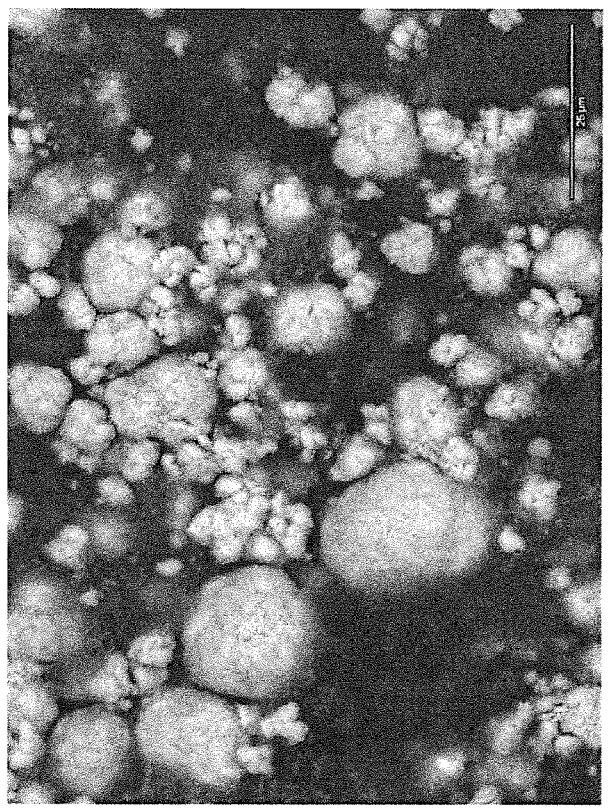
FIG. 2A illustrates SEM analyses of an NCM 111 material used as an anode active material in an electrochemical cell illustrating the image produced by detection of secondary electrons where the bar in the lower right depicts the scale of 25 µm.
Figure 2B:
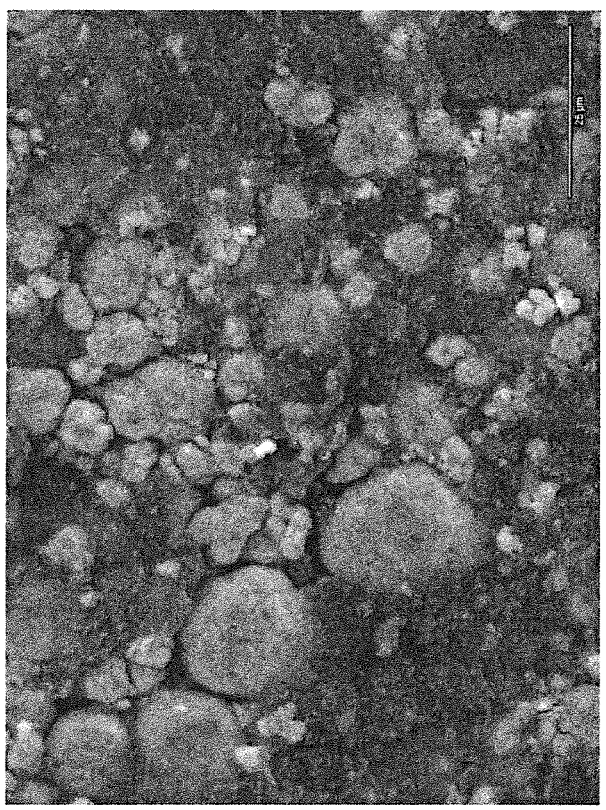
FIG. 2B illustrates SEM analyses of an NCM 111 material used as an anode active material in an electrochemical cell illustrating the image produced by detection of backscattered electrons where the bar in the lower right depicts the scale of 25 µm.

The alloy phase distribution and composition were examined using a JEOL-JSM6320F scanning electron microscope with energy dispersive spectroscopy (EDS) capability. Samples were mounted and polished on epoxy blocks, rinsed and dried before entering the SEM chamber. Back scattering electron images of NCM 111 material as precipitated are presented in FIG. 2A illustrating the secondary electron image and FIG. 2B illustrating the back scattered electron image. Parsing out the contributions by each of the three elements illustrates overall disordered distribution of the nickel, cobalt, and manganese throughout the system (data not shown).

Figure 3B:
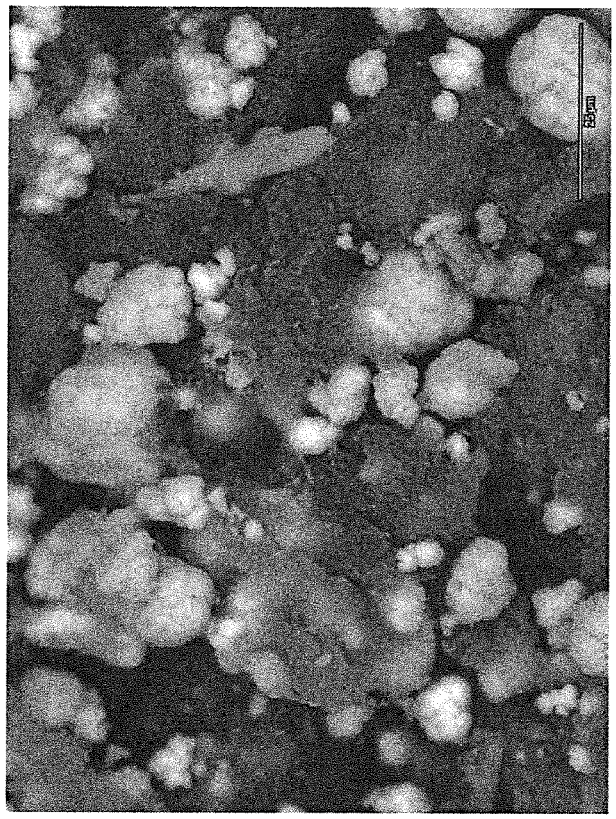
FIG. 3B illustrates SEM analyses of an NCM 111 material used as an anode active material following cycling in an electrochemical cell illustrating the image produced by detection of backscattered electrons where the bar in the lower right depicts the scale of 25 µm.
Figure 3A:
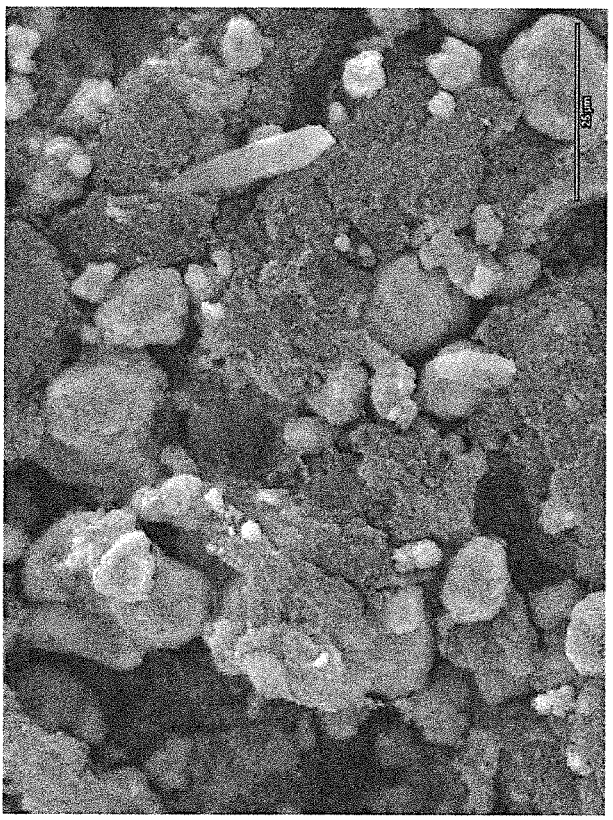
FIG. 3A illustrates SEM analyses of an NCM 111 material used as an anode active material following cycling in an electrochemical cell illustrating the image produced by detection of secondary electrons where the bar in the lower right depicts the scale of 25 µm.

Following cycling of the NCM 111 material, a second SEM analyses is performed. The results are depicted in FIG. 3A and FIG. 3B. The images illustrate clear segregation of the individual elements in the cell demonstrating ordering by element type. EDS mapping of the location of each element reveals that the nickel hydroxide segregates from the other elements reducing the disorder of the system.

Figure 4B:
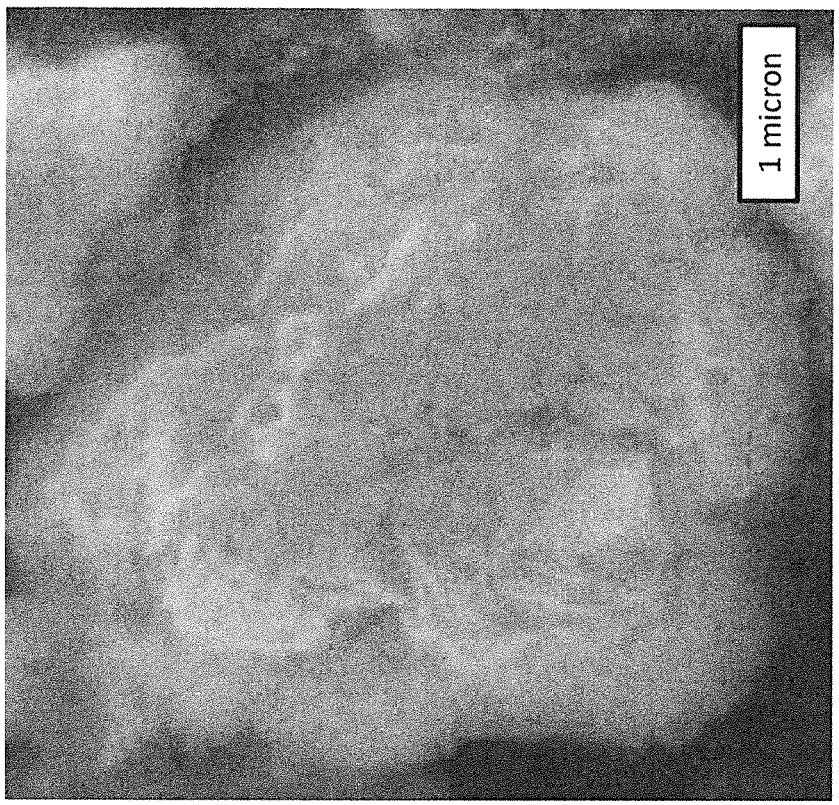
FIG. 4B illustrates SEM analyses of an NCM 111 material used as an anode active material in an electrochemical cell following cycling illustrating the appearance of hydroxide platelets indicating the introduction of significant order in the as introduced by electrochemical cycling where the scale is 1 µm.
Figure 4A:
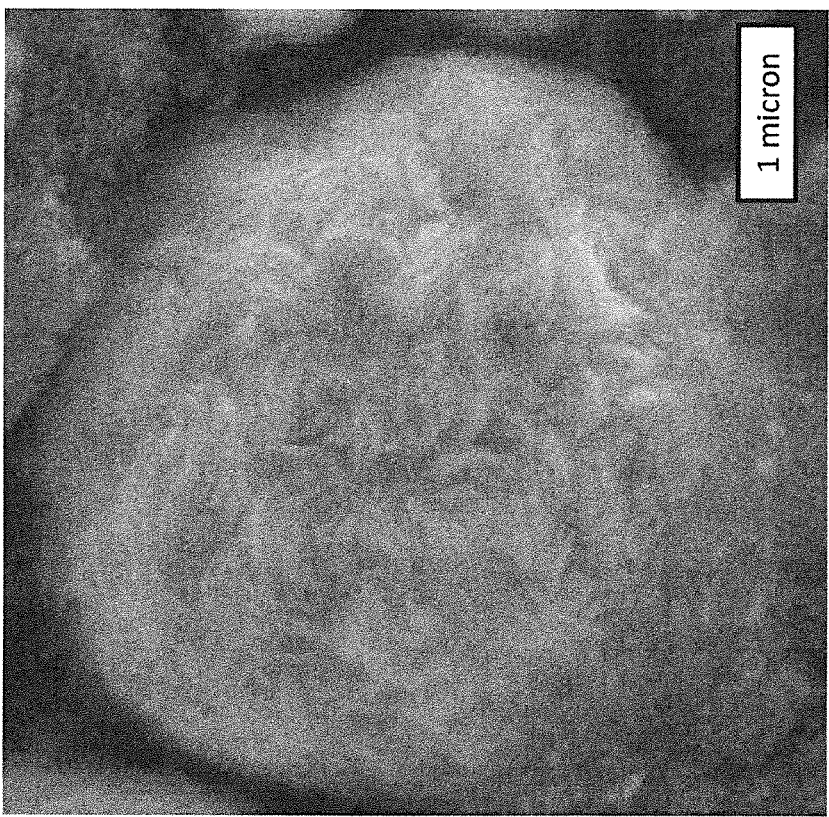
FIG. 4A illustrates SEM analyses of an NCM 111 material used as an anode active material in an electrochemical cell illustrating the significant structural disorder in the as formed material where the scale is 1 µm.

Increasing the magnification of the images before and after cycling reveals significantly disordered macrostructure in the SEM morphology in the as formed precipitate as depicted in FIG. 4A. The hydroxide platelets in the as-formed sample lie outward from the center of the particle. As depicted in FIG. 4B, following cycling, new platelets are formed which are parallel to the surface of the particle. These new platelets represent the introduction of significant order to the structure of the active material.

Electrochemical Characterization

The discharge capacity of each of the NCM alloys as well as control alloys as presented in Table 1 was measured in a flooded-cell configuration against a partially pre-charged $Ni(OH)_2$ positive electrode. For the half-cell electrochemical studies, the anode active material was passed through a 200-mesh sieve. The sieved powder was then compacted onto an expanded nickel metal substrate by a continuous roll mill. This allowed improved measurement of the activation behavior. Discharge capacities of the resulting small-sized electrodes were measured in a flooded cell configuration using a partially pre-charged $Ni(OH)_2$ pasted electrode as the positive electrode and a 6M KOH solution as the electrolyte. The system was charged at a current density of 5 mA/g for 5 h and then discharged at a current density of 5 mA/g until a cut-off voltage of 0.9 V was reached. Results are presented in Table 1.

TABLE 1

| Anode Material | Discharge capacity (mAh/g) |
|---|---|
| $Ni(OH)_2$ | 1 |
| $Mn(OH)_2$ | 0 |
| $Ni_{0.91}Co_{0.09}(OH)_2$ | 0 |
| $Ni_{0.91}Zn_{0.09}(OH)_2$ | 0 |
| $Ni_{0.91}Mn_{0.09}(OH)_2$ | 0 |
| $Ni_{0.33}Co_{0.33}Mn_{0.33}(OH)_2$ | 20.7 |
| $Ni_{0.4}Co_{0.2}Mn_{0.4}(OH)_2$ | 20.1 |

Using simple $Ni(OH)_2$ versus the partially pre-charged $Ni(OH)_2$ revealed low performance with a capacity of 1 mAh/g. When two transition elements were included in the anode active material, no measureable capacity was obtained. When three elements were included so as to sufficiently increase the compositional and structural disorder of the anode active material, capacities jumped to over 20 mAh/g. These results indicate that in a Ni/Ni cell compositional and structural disorder are required to provide sufficient capacity to the overall system.

Overall, these results demonstrate the ability of a Ni/Ni cell to function as a viable alternative to prior nickel based alkaline secondary cells.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

In view of the foregoing, it is to be understood that other modifications and variations of the present invention may be implemented. The foregoing drawings, discussion, and description are illustrative of some specific embodiments of the invention but are not meant to be limitations upon the practice thereof. It is the following claims, including all equivalents, which define the scope of the invention.

The invention claimed is:

1. An alkaline rechargeable cell comprising: a cathode comprising a nickel hydroxide based material; an anode comprising a compositionally and structurally disordered metal hydroxide alloy material comprising a material of the formula $Ni_xCo_yMn_z(OH)_2$ where $0.3 \leq x \leq 0.5$, $0.2 \leq y \leq 0.4$, $0.3 \leq z \leq 0.4$, where x, y and z are relative atomic amounts of Ni, Co and Mn respectively, and where x+y+z=1; and an electrolyte in chemical contact with said cathode and said anode.

2. The cell of claim 1 wherein said metal hydroxide alloy comprises nickel as a predominant transition metal.

3. The cell of claim 1 wherein said metal hydroxide alloy comprises $Ni_{0.33}Co_{0.33}Mn_{0.33}(OH)_2$.

4. The cell of claim 1 wherein said metal hydroxide alloy comprises $Ni_{0.4}Co_{0.2}Mn_{0.4}(OH)_2$.

5. The cell of claim 1 wherein said metal hydroxide alloy comprises $Ni_{0.5}Co_{0.2}Mn_{0.3}(OH)_2$.

6. The cell of claim 1 wherein said metal hydroxide alloy is absent a (100) peak by XRD analysis.

7. The cell of claim 1 wherein said metal hydroxide alloy comprises a capacity of 15 milliAmpere hours/gram or greater against said cathode.

8. An alkaline rechargeable cell comprising: a cathode comprising nickel hydroxide; an anode comprising a compositionally and structurally disordered metal hydroxide alloy material comprising a material of the formula $Ni_xCo_yMn_z(OH)_2$ where $0.3 \leq x \leq 0.5$, $0.2 \leq y \leq 0.4$, $0.3 \leq z \leq 0.4$, where x, y and z are relative atomic amounts of Ni, Co and Mn respectively, and where x+y+z=1, said anode having a capacity of 15 milliAmpere hours/gram or greater against said cathode.

9. The cell of claim 8 wherein said metal hydroxide alloy is absent a (100) peak by XRD analysis.

10. The cell of claim 8 wherein said metal hydroxide alloy comprises $Ni_{0.33}Co_{0.33}Mn_{0.33}(OH)_2$, $Ni_{0.4}Co_{0.2}Mn_{0.4}(OH)_2$, $Ni_{0.5}Co_{0.2}Mn_{0.3}(OH)_2$, or combinations thereof.

* * * * *